United States Patent
Ito et al.

(10) Patent No.: US 9,377,849 B2
(45) Date of Patent: Jun. 28, 2016

(54) INFORMATION PROCESSING APPARATUS AND CONTROL METHOD FOR RECOGNIZING A TOUCH OPERATION

(71) Applicant: CANON KABUSHIKI KAISHA, Tokyo (JP)

(72) Inventors: Hikaru Ito, Tokyo (JP); Seiko Kono, Kawasaki (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/927,461

(22) Filed: Jun. 26, 2013

(65) Prior Publication Data

US 2014/0002395 A1  Jan. 2, 2014

(30) Foreign Application Priority Data

Jun. 29, 2012 (JP) .................... 2012-147152

(51) Int. Cl.
| | |
|---|---|
| G06F 3/041 | (2006.01) |
| G06F 3/01 | (2006.01) |
| G06F 3/0487 | (2013.01) |
| G06F 3/0488 | (2013.01) |
| G06F 1/16 | (2006.01) |

(52) U.S. Cl.
CPC ................ *G06F 3/01* (2013.01); *G06F 1/1694* (2013.01); *G06F 3/0487* (2013.01); *G06F 3/0488* (2013.01)

(58) Field of Classification Search
CPC ........ G06F 3/01; G06F 3/0487; G06F 3/0488
USPC ....................................................... 345/173
See application file for complete search history.

(56) References Cited

U.S. PATENT DOCUMENTS

| | | | | |
|---|---|---|---|---|
| 2010/0053081 | A1* | 3/2010 | Jee ..................... | G06F 1/1615 345/157 |
| 2010/0216447 | A1* | 8/2010 | Park ................... | H04M 1/0235 455/418 |
| 2011/0074721 | A1* | 3/2011 | Goto .................. | G06F 3/03547 345/173 |
| 2012/0154294 | A1* | 6/2012 | Hinckley ........... | G06F 1/1649 345/173 |
| 2012/0306903 | A1* | 12/2012 | Griffin ............... | G06F 1/1694 345/589 |
| 2013/0033434 | A1* | 2/2013 | Richardson ........ | G06F 3/0488 345/173 |

FOREIGN PATENT DOCUMENTS

| | | |
|---|---|---|
| JP | 2011-180943 A | 9/2011 |
| JP | 2012-118575 A | 6/2012 |

\* cited by examiner

*Primary Examiner* — Jonathan Blancha
(74) *Attorney, Agent, or Firm* — Canon USA Inc. IP Division

(57) ABSTRACT

An apparatus capable of multi-touch operation useful for preventing a false operation despite a user's intention recognizes a touch operation and includes a touch detection unit configured to detect a touch point in a target area of the touch operation, a detection unit configured to detect a movement of the information processing apparatus, a determination unit configured to determine that, among a plurality of touch points detected by the touch detection unit, a touch point which begins to be detected before the apparatus moves and is being detected when the movement is detected, as not valid, and a recognition unit configured to recognize the touch operation based on, among the plurality of touch points detected by the touch detection unit, based on a touch point excluding the touch point determined as not valid by the determination unit.

19 Claims, 10 Drawing Sheets

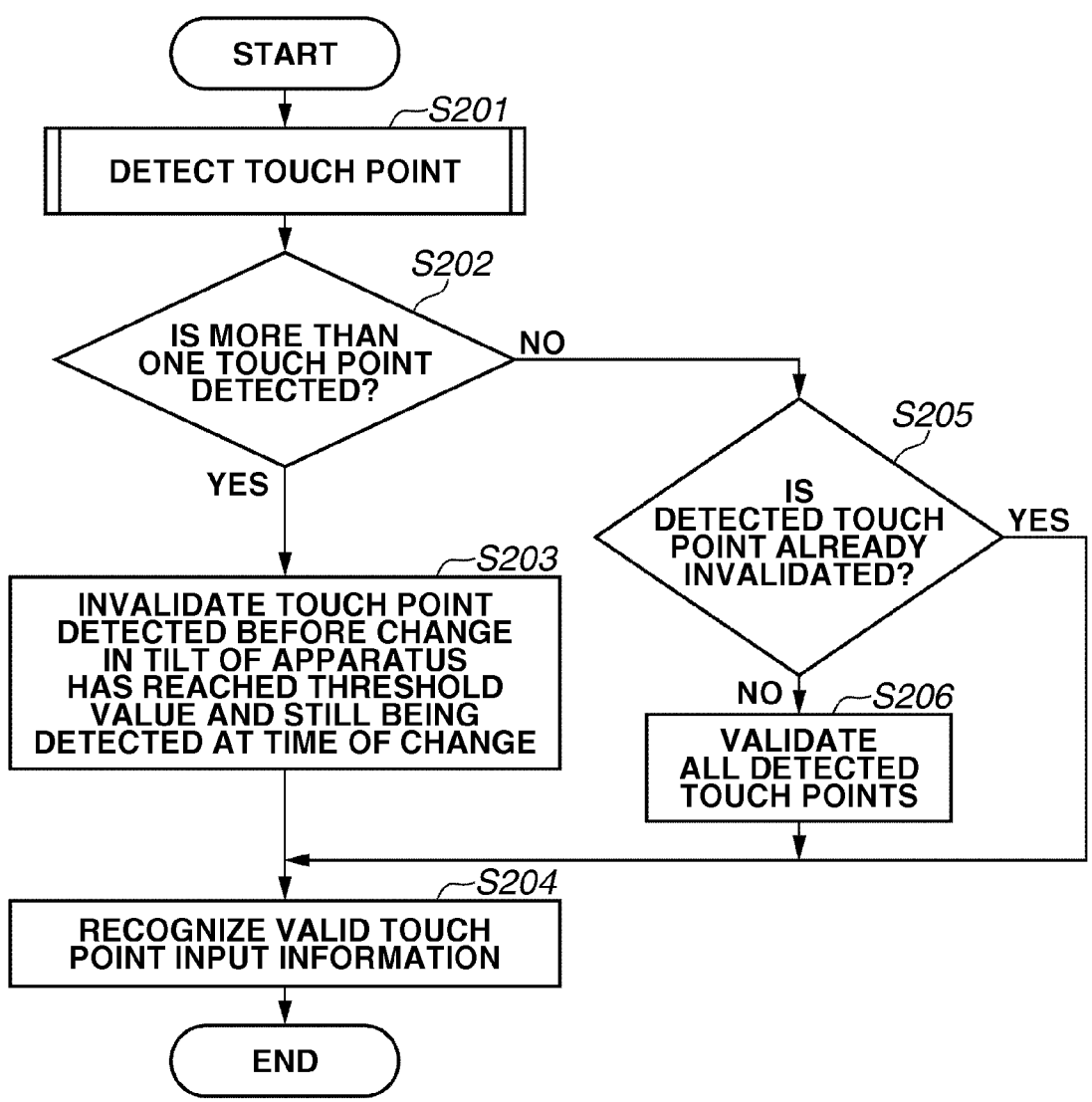

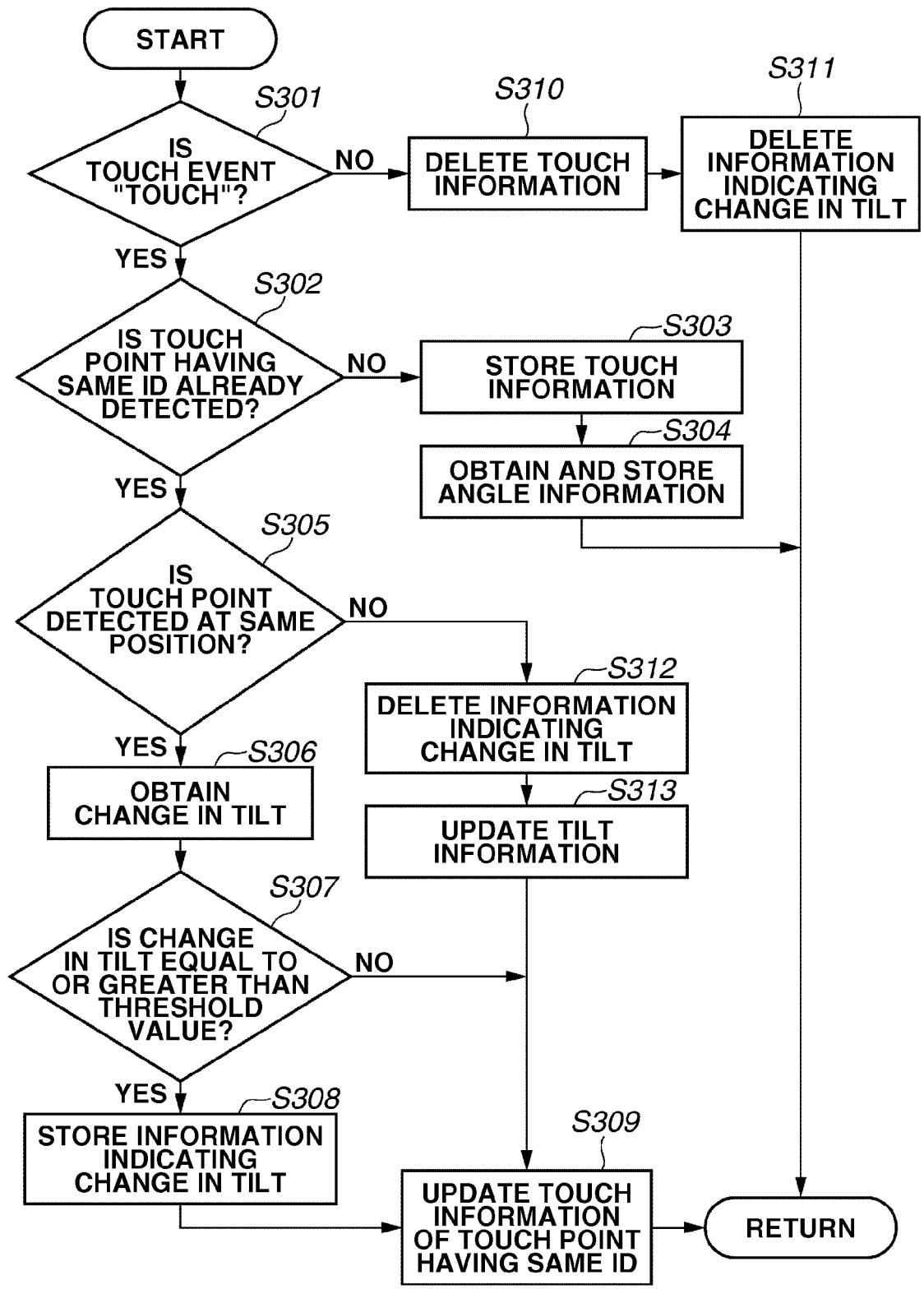

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 0 | FALSE | 90 | 0 |

*601*

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 20 | FALSE | 90 | -10 |

*602*

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 40 | TRUE | 90 | -20 |

*603*

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 80 | TRUE | 90 | -60 |

*604*

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 1080 | TRUE | 90 | -60 |
| 1 | 400 | 180 | 1070 | FALSE | 30 | 0 |

*605*

| ID | X [dot] | Y [dot] | Time [ms] | TILT CHANGE FLAG | INITIAL DEGREE [degree] | CHANGE IN DEGREE [degree] |
|---|---|---|---|---|---|---|
| 0 | 40 | 340 | 2080 | TRUE | 90 | -60 |

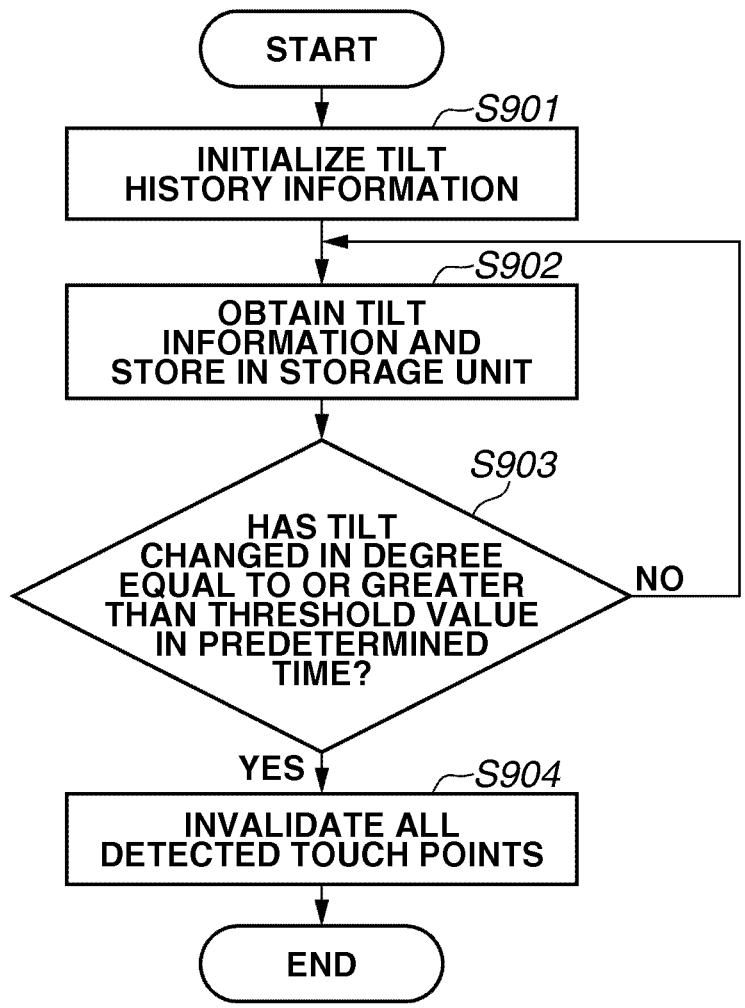

INFORMATION PROCESSING APPARATUS AND CONTROL METHOD FOR RECOGNIZING A TOUCH OPERATION

BACKGROUND OF THE INVENTION

1. Field of the Invention

The present invention relates to a technique useful for recognizing a touch operation.

2. Description of the Related Art

In recent years, touch input devices including a touchscreen have been widely used. When a user touches the screen with a finger or a stylus, the X and Y coordinates of the touched position are obtained as input values. Various types of processing are performed based on this input value. Further, techniques for multi-touch, which allows sensing of two or more points on a surface of a screen, are developing. According to this multi-touch operation, the user can perform various operations such as enlarge, reduce, and scroll of a text by touching two points on the screen, for example, with the thumb and the index finger of the right hand.

In such a case, a large screen close to the size of an entire device is desirable as the touch input device. If the device has the large screen, however, the user may inadvertently touch the screen when holding the input device. If the user touches the screen of a touch input device capable of multi-touch operation, unintended touch input may be recognized by the device despite the user's intention. This may result in false operation.

A technique for invalidating the unintended touch point is discussed in Japanese Patent Application Laid-Open No. 2011-180943. According to Japanese Patent Application Laid-Open No. 2011-180943, if an information processing terminal is tilted by a predetermined degree from a horizontal position and if a predetermined point is continuously touched for a predetermined period of time, it is considered that the point is touched by the user to hold the terminal device, and the touch point is invalidated.

The information processing apparatus which is operated by touch or multi-touch is assumed to be used in various positions. Thus, it is not always appropriate to determine whether a touch point should be invalidated by detecting whether the apparatus is tilted by a predetermined angle or more as discussed in Japanese Patent Application Laid-Open No. 2011-180943.

SUMMARY OF THE INVENTION

According to an aspect of the present disclosure, an information processing apparatus capable of touch operation can prevent a false operation by a touch operation of a user despite the user's intention without being affected by the position or posture of the apparatus.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 2 is a flowchart illustrating touch input recognition processing.

FIG. 3 is a flowchart illustrating touch point detection processing.

FIG. 6 illustrates examples of information stored in a storage unit.

FIG. 9 is a flowchart illustrating touch input invalidation processing.

DESCRIPTION OF THE EMBODIMENTS

Various exemplary embodiments, features, and aspects of the disclosure will be described in detail below with reference to the drawings.

The exemplary embodiments describe below are examples when the present disclosure is executed in a concrete manner.

Figure 1A:
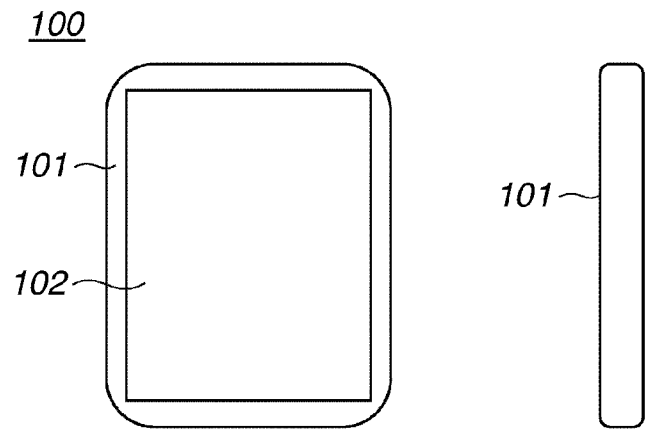
FIG. 1A illustrates an example of an appearance of an information processing apparatus.
Figure 1B:
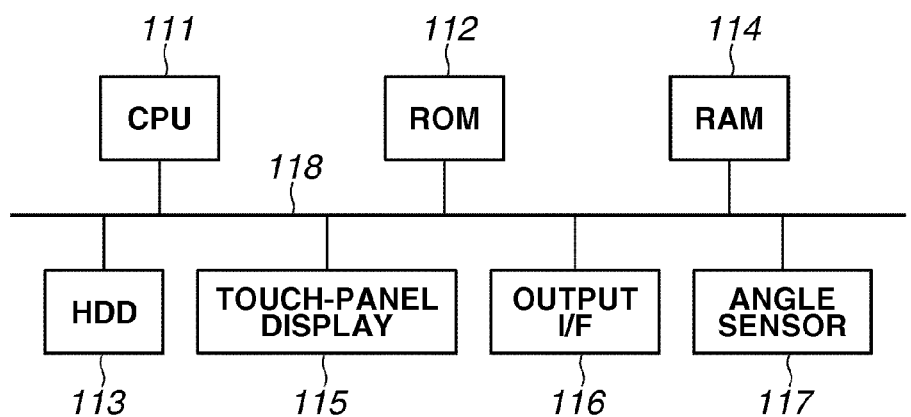
FIG. 1B is a block diagram illustrating an example of a hardware configuration of the information processing apparatus.

FIGS. 1A and 1B illustrate an example of an appearance of an information processing apparatus and a hardware configuration of the information processing apparatus according to a first exemplary embodiment of the present disclosure. FIG. 1A illustrates a mobile terminal, which is an example of an information processing apparatus 100, viewed from the front and one side of the screen. The size of the information processing apparatus 100 according to the present embodiment is a size which can be held by the user's one hand.

In FIG. 1A, an enclosure 101 is an outer peripheral portion of an input area 102 and is formed by synthetic resin or metal. When the user holds the information processing apparatus 100, the user normally holds the enclosure 101 by hand. The input area 102 is a target area of the touch operation and includes a touch sensor. The input area 102 accepts the input operation performed by the user for the information processing apparatus 100.

According to the present embodiment, the input area 102 is a touch panel display having the touch sensor provided on a display as a display unit. An interface used for operating the information processing apparatus 100 or an apparatus connected to the information processing apparatus 100 is displayed on the display screen. According to the present embodiment, the information processing apparatus 100, which is a mobile terminal such as the one illustrated in FIG. 1A, will be described.

In the following description, "move" corresponds to tilting, moving up/down, or rotating the apparatus or a combination of such movements by the user using his hand. In the following description, although the movement associated with tilt is mainly described, if an up/down movement or a rotation of the apparatus can be detected, the present embodiment can be also applied to these various movements other than the tilt.

According to the present embodiment, the information processing apparatus 100 recognizes a touch operation of the user touching the input area 102. The point in the input area 102 touched by the user is hereinafter referred to as a touch point. If the user moves the information processing apparatus 100, for example, by holding it up, there is a possibility of the user touching the input area 102 during the movement. This means that the touch points which have been detected before the start of the movement and are still being detected during the movement are likely to be the points in the input area 102 which the user touched when the user held the apparatus. Thus, the information processing apparatus 100 regards such touch points as those associated with the holding of the apparatus and not associated with the touch operation. Accordingly, the information processing apparatus 100 invalidates such touch points.

The present embodiment is based on a concept that, among the plurality of touch points which have been detected, the touch point which begins to be detected before the tilt of the information processing apparatus 100 changes by a value equal to or greater than a predetermined threshold value, and is being detected during the tilt change, is likely to be the touch point touched by the user in the input area 102 when the user holds the apparatus by hand. Thus, when the angle of tilt of the information processing apparatus 100 is obtained, a touch input which begins to be detected before the angle of tilt changes by a predetermined threshold value or greater and is still being detected when the change is detected, is invalidated.

FIG. 1B illustrates an example of a block diagram of a hardware configuration of the information processing apparatus 100 according to the present embodiment. In FIG. 1B, the hardware configuration includes a central processing unit (CPU) 111, a read-only memory (ROM) 112, and a hard disk drive (HDD) 113.

According to the present embodiment, the CPU 111 controls each device by reading out and executing a control program stored in the ROM 112 or the HDD 113. When the control program is executed, the information processing apparatus 100 can execute various operations described in the present embodiment. The control program and various kinds of data used for the program are stored in the ROM 112. A random access memory (RAM) 114 includes a work area used by the CPU 111 when it executes the aforementioned program. The RAM 114 is also used as a save area when an error is being handled by the CPU 111 as well as a load area of the control program. The HDD 113 stores the control programs described above and various kinds of data.

A touch panel display 115 is a device which serves as a touch sensor used for obtaining information of the user operation in the input area 102 as well as a display screen for displaying information. An output I/F 116 is an interface for outputting various information to an output device other than the display via a network or the like. An angle sensor 117 is, for example, an acceleration sensor and detects the angle of tilt of the information processing apparatus 100 with respect to the vertical direction. An address signal designating each component of the apparatus as a control target to be controlled by the CPU 111, a control signal used for controlling each component, and data transferred between the components are exchanged via a bus 118.

The above-described control program can be stored in the ROM 112 or the HDD 113 in advance. Alternatively, the control program can be received as needed from an external apparatus via a network and stored in the ROM 112 or the HDD 113.

The CPU 111 executes various functions of the information processing apparatus 100 described below or various operations described below with reference to flowcharts by executing a program stored in the ROM 112 or the HDD 113.

Figure 1C:
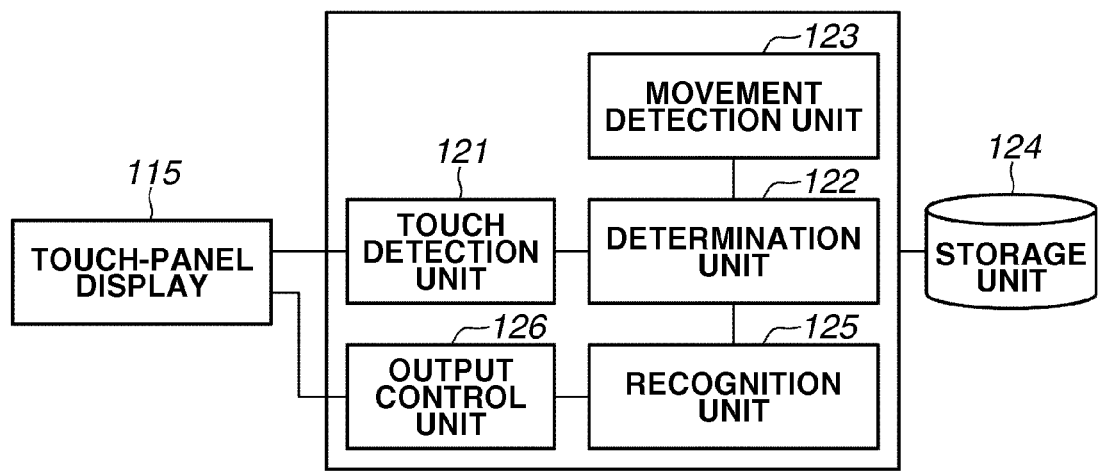
FIG. 1C is a block diagram illustrating an example of a functional configuration of the information processing apparatus.

FIG. 1C is an example of a block diagram of a software configuration of the information processing apparatus 100. A touch detection unit 121 is configured from the CPU, ROM, and RAM (hereinafter, referred to as CPU and memories). The touch detection unit 121 receives a signal from the touch sensor of the touch panel display 115 and obtains information of the touch point touched by the user. The information regarding the touch point is, for example, coordinates information of the touch point in the input area 102, the time the touch point has been detected at that point, and the order the touch point has been detected.

A determination unit 122 is configured from, for example, the CPU and memories. The determination unit 122 executes processing based on the change in the number of touch points detected by the touch detection unit 121 and determines whether the detected touch point is valid as an input to the information processing apparatus 100. A movement detection unit 123 is configured from the angle sensor 117 and the CPU and memories. The movement detection unit 123 detects the tilt of the information processing apparatus 100 at a fixed time interval and determines whether the tilt is changed by a predetermined angle or more. If the tilt is changed by a predetermined angle or more, the movement detection unit 123 obtains information of the movement of the information processing apparatus. A storage unit 124 corresponds to the RAM 114. The storage unit 124 stores the information of the touch point detected by the touch detection unit 121 and the information of the angle detected by the movement detection unit 123. The determination unit 122 refers to the information stored in the storage unit 124.

A recognition unit 125 is configured from the CPU and memories. The recognition unit 125 receives the determination result sent from the determination unit 122, obtains information of the valid touch point from the information stored in the storage unit 124, and recognizes the information as input information associated with the touch operation. If a touch input by the user is recognized, an output control unit 126 controls the output of the result. According to the present embodiment, each of these units realizes its function by the CPU loading a program stored in the ROM to the RAM and executing it. However, the present invention can also be realized by the hardware of the information processing apparatus realizing each function. In that case, a calculation unit and a circuit are provided for each function unit.

Next, touch input recognition processing according to the present embodiment will be described with reference to the flowchart in FIG. 2. According to the present embodiment, although the touch input recognition processing described below is started when the information processing apparatus 100 is powered on, it may be started when the lock of the information processing apparatus is released or a particular application is started.

In step S201, the touch detection unit 121 obtains information of a touch point in the input area 102. More precisely, the touch sensor of the touch panel display 115 detects a touch by the user in the input area 102 to carry out an operation. Further, based on the information obtained from the touch sensor, the touch detection unit 121 obtains positional information of the touched point. Additionally, the touch detection unit 121 obtains the detection time of the touch point, the ID of the touch point, and information of whether the tilt of the information processing apparatus 100 is changed by an angle equal to or greater than a threshold value (whether a tilt change flag is set). The obtained information is stored in the storage unit 124.

According to the present embodiment, the tilt change flag is set to TRUE for the detected touch point when the change in the tilt of the information processing apparatus 100 is equal to or greater than the threshold value. The tilt flag is set to FALSE for other touch points. The tilt change flag uses, for example, one bit and is TRUE if it is 1, and FALSE if it is 0. Further, if touch points having a same ID are detected at different points (positions) in the input area, the touch detection unit 121 updates the information and stores it in the memory.

According to the present embodiment, the position information is presented by coordinates (x, y) based on the plane of coordinates having the upper left corner of the input area 102 as the point of origin. Further, the ID is identification information for identifying the touch point detected by the touch detection unit 121. According to the present embodiment, the ID is assigned to the touch point in the order the touch point has been detected in the input area 102 starting from 0 and incremented by 1 (0, 1, . . . ). Further, if the user releases his finger from the input area 102, the touch detection unit 121 deletes the information of the corresponding touch point from the storage unit 124. Details of the processing for obtaining the touch point is described below.

In step S202, the determination unit 122 determines whether a plurality of touch points is detected by the touch detection unit 121. More precisely, the determination unit 122 refers to the information stored in the storage unit 124, obtains the number of touch points from the number of stored IDs, and determines whether a plurality of touch points has been detected. In step S202, if it is determined that a plurality of touch points has been detected (YES in step S202), the processing proceeds to step S203. If it is determined that a plurality of touch points has not been detected (NO in step S202), the processing proceeds to step S205.

In step S203, among the plurality of touch points which has been detected, the determination unit 122 invalidates the touch point which begins to be detected before the change in the tilt of the information processing apparatus 100 has become equal to or greater than the threshold value and is being detected when the change is detected. The determination unit 122 according to the present embodiment refers to the information stored in the storage unit 124 and determines the touch point to be invalidated based on the state of the tilt change flag (TRUE or FALSE) indicating whether the change in the tilt of the information processing apparatus 100 is equal to or greater than a threshold value. Then the determination unit 122 notifies the recognition unit 125 of a determination result.

In step S204, the recognition unit 125 recognizes the valid input information associated with the touch point and then the recognition processing of the touch input operation performed by the user ends.

On the other hand, in step S205, the determination unit 122 determines whether the obtained touch point is a touch point already invalidated by the determination unit 122. If the obtained touch point is a point already invalidated by the determination unit 122, the possibility that the touch point is touched by the user in the input area 102 to hold the information processing apparatus 100, is high. Therefore, according to the present embodiment, the touch point is continuously invalidated. Thus, if the obtained touch point has already been determined by the determination unit 122 as an invalidated touch point (YES in step S205), the processing proceeds to step S204. On the other hand, if the obtained touch point has not yet been determined by the determination unit 122 as an invalidated touch point (NO in step S205), the processing proceeds to step S206.

In step S206, the determination unit 122 determines that all the input in the detected touch points is valid and sends the result of the determination to the recognition unit 125.

FIG. 3 is a flowchart illustrating the touch point detection processing performed in step S201.

In step S301, the touch detection unit 121 determines whether the touch event notified by the touch sensor is "TOUCH". When the touch sensor used in the present embodiment detects that the input area 102 is touched or the touch is released, the touch sensor notifies the touch detection unit 121 of the touch event. According to the present embodiment, "TOUCH" is notified to the touch detection unit 121 as the touch event if the input area 102 is touched. On the other hand, "RELEASE" is notified to the touch detection unit 121 as the touch event if the detected touch is released. If it is determined that the notified touch event is "TOUCH" (YES in step S301), the processing proceeds to step S302. If it is determined that the notified touch event is not "TOUCH" but "RELEASE" (NO in step S301), the processing proceeds to step S310.

In step S302, the touch detection unit 121 determines whether a touch point having a same ID as the touch point corresponding to the touch event "TOUCH" is already detected. The touch detection unit 121 refers to the information stored in the storage unit 124 and determines whether a corresponding ID is included. If it is determined that a touch point having a same ID does not exist (NO in step S302), the processing proceeds to step S303. On the other hand, if it is determined that a touch point having a same ID already exists (YES in step S302), the processing proceeds to step S305.

In step S303, the touch detection unit 121 newly adds the ID, the coordinates, and the detection time of the touch point associated with the touch event "TOUCH" to the information stored in the storage unit 124.

In step S304, the movement detection unit 123 obtains the angle information indicating the tilt of the information processing apparatus 100 and adds the obtained angle information to the information stored in the storage unit 124 as the initial angle of the touch point that is the target of the processing.

In step S305, the touch detection unit 121 determines whether the touch point associated with the touch event "TOUCH" is detected at a position same as the point it has been detected before. The touch detection unit 121 refers to the coordinates of the touch point stored in the storage unit 124 and determines whether the point is the same as the touch point detected this time associated with the touch event "TOUCH". If it is determined that the touch point is detected at the same point (YES in step S305), the processing proceeds to step S306. If it is determined that the touch point is detected at a different point (NO in step S305), the processing proceeds to step S312.

In step S306, the movement detection unit 123 obtains the change in tilt after the touch point is detected. According to the present embodiment, the movement detection unit 123 obtains angular information of the tilt of the information processing apparatus 100 and refers to the angular information associated with the touch point which corresponds to the touch event "TOUCH" and stored in the storage unit 124, and calculates the change in the angle of the tilt of the apparatus.

In step S307, the movement detection unit 123 determines whether the change in the tilt is equal to or greater than the threshold value. The movement detection unit 123 compares the angle obtained in step S306 and the threshold value stored in advance. If the angle obtained in step S306 is equal to or greater than the threshold value, the movement detection unit 123 determines that the change in the tilt is equal to or greater than the threshold value (YES in step S307), and the processing proceeds to step S308. On the other hand, if the movement detection unit 123 determines that the change in the tilt is less than the threshold value (NO in step S307), the processing proceeds to step S309.

In step S308, the movement detection unit 123 associates the information indicating that the tilt is changed with the information of the touch point stored in the storage unit 124 and stores the information. According to the present embodiment, the tilt change flag is set to TRUE with respect to the touch point which begins to be detected before the change in the tilt of the information processing apparatus 100 has become equal to or greater than the threshold value, and is being detected when the change is detected. Regarding the touch point whose tilt change flag is already set to TRUE, the flag is maintained.

In step S309, the touch detection unit 121 updates the detection time and the position information of the touch point having the same ID as the touch event "TOUCH" detected in step S301, out of the information stored in the storage unit 124 as needed. When the information is updated, the processing returns to the touch input recognition processing (see FIG. 2).

If the touch event is determined as not "TOUCH" (NO in step S301), in other words, if a touch event other than "TOUCH" is notified from the touch sensor, according to the present embodiment, the touch event "RELEASE" is notified. In step S310, the touch detection unit 121 deletes information associated with the ID corresponding to the touch point of the detected touch event "RELEASE", out of the information stored in the storage unit 124. At that time, the touch detection unit 121 also deletes the ID from the storage unit 124.

In step S311, if information indicating that the tilt has changed is associated with the touch point, the movement detection unit 123 deletes the information. Further, according to the present embodiment, the tilt change flag set to "TRUE" in step S308 is updated to FALSE. Then, the processing returns to the touch input recognition processing (see FIG. 2). If information indicating that the tilt has changed is not associated with the touch point of the detected "RELEASE", the processing in step S311 is skipped.

Further, if it is determined as NO in step S305, in other words, if a touch point having the ID already detected is found at a different point, according to the present embodiment, it is considered that a new touch point has been detected. In step S312, if the information indicating the change in the tilt of the touch point is TRUE, it is changed to FALSE. According to the present embodiment, the tilt change flag set to TRUE in step S308 is changed to FALSE. In step S313, the movement detection unit 123 obtains angular information regarding the tilt of the information processing apparatus 100 and updates the initial angle stored in the storage unit 124. Then, the processing returns to the touch input recognition processing (see FIG. 2).

According to the present embodiment, while a touch panel notifies the touch event "TOUCH"/"RELEASE" when the touch sensor detects the touch/release operation in the input area 102, the touch panel of the present invention is not limited to such a panel. For example, a touch panel may notify "TOUCH_DOWN" if the input area 102 is newly touched, "MOVE" if a movement of a touch point having an already-detected ID is detected, or "TOUCH_UP" if the touch is released.

In such a case, if "TOUCH_DOWN" is notified, information of the touch point and the tilt is newly added to the storage unit 124. If "MOVE" is notified, information of the touch point having the same ID is updated. If "TOUCH_UP" is notified, information of the touch point having the same ID is deleted. Further, the movement detection unit 123 detects the angle of the tilt of the information processing apparatus 100 from when the touch event "TOUCH_DOWN" is notified until when "MOVE" or "TOUCH_UP" of the touch point having the same ID is notified. The movement detection unit 123 detects the angle of the tilt at a predetermined time interval and compares the amount of change of the angle with the threshold value. Then, among touch points as to which "MOVE" is notified (touch points already detected at the same position), the tilt change flag of the touch point which has been detected when the change is equal to or greater than the threshold value, is set to TRUE.

As described above, the information processing apparatus 100 identifies the plurality of touch points detected via the touch panel serving as the input device, by the IDs and manages the information. Since the movement of each of the plurality of touch points can be detected, multi-touch operation based on the plurality of touch points can be recognized.

Next, an operation example of the information processing apparatus 100 according to the first exemplary embodiment will be described with reference to drawings. FIGS. 4A to 4C and 5A to 5C illustrate an operation example 1 of the information processing apparatus 100. Further, tables 600 to 605 in FIG. 6 illustrate examples of the information stored in the storage unit 124. The setting of the information processing apparatus 100 used in the operation example is made such that the touch point, which is being detected when the angle of tilt has changed 20 degrees or more, is invalidated and not recognized as an input.

Figure 4A:
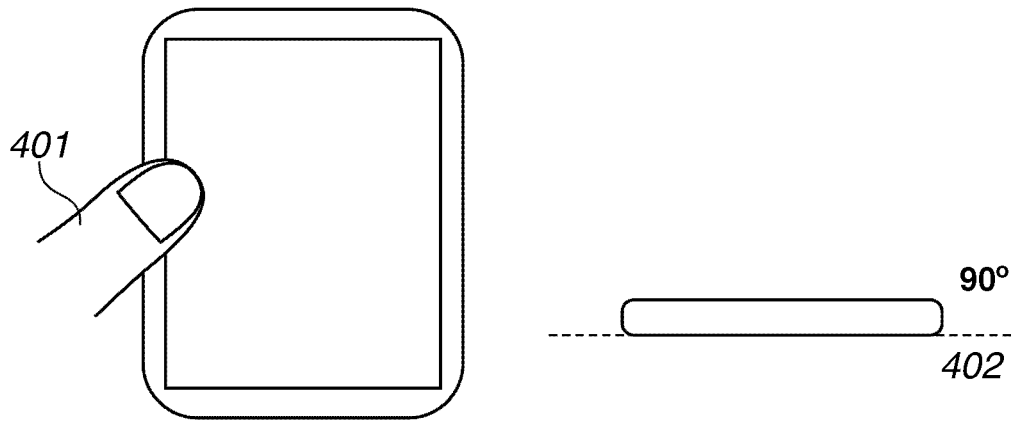
FIGS. 4A to 4C illustrate operation examples of the information processing apparatus.
Figure 4B:
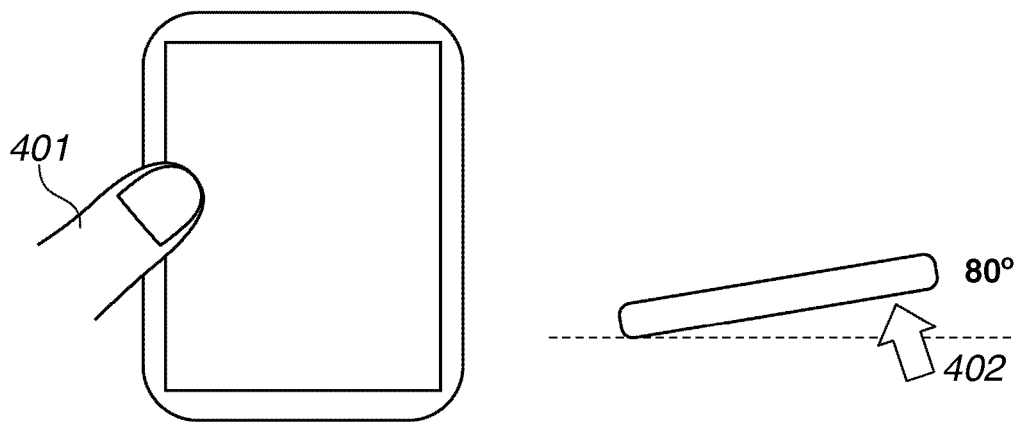
Figure 4C:
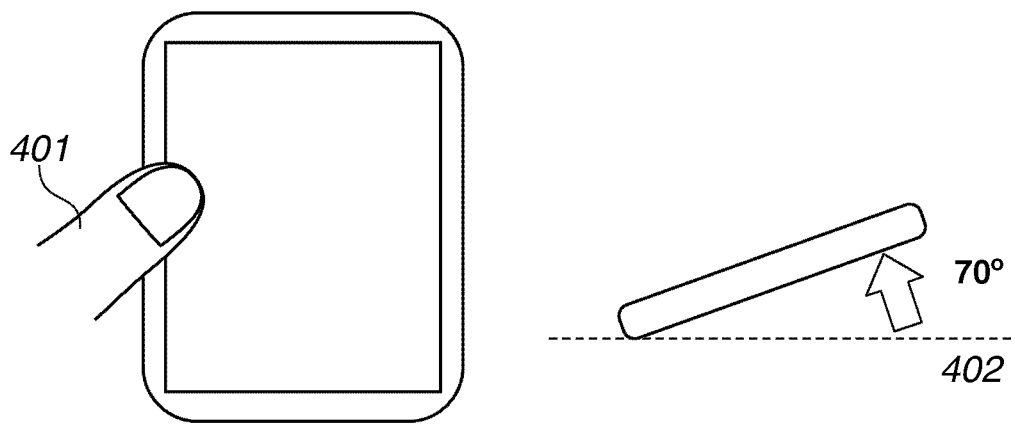

FIGS. 4A to 4C illustrate the information processing apparatus 100 viewed from the front and the side. The illustration on the left side is the front view and the illustration on the right side is the side view.

The input area 102 of the touch panel display 115 of the information processing apparatus 100 described below has a resolution of 480 dots×640 dots. The position information is managed based on a coordinate plane having the upper left corner of the input area as the point of origin. Further, a touch point in the input area 102 is searched every 20 milliseconds by the touch sensor of the touch panel display 115. According to the result of the search, the touch sensor notifies the touch detection unit 121 of the touch event "TOUCH" or "RELEASE" and the angle sensor 117 detects the angle that indicates the tilt of the information processing apparatus 100 with respect to the vertical direction every 10 milliseconds.

FIG. 4A illustrates a state just before the user holds up the information processing apparatus 100 placed on a horizontal plane. The information processing apparatus 100 is parallel to a horizontal line 402. At this time, the angle sensor 117 detects 90 degrees with respect to the vertical direction. If the user touches the input area 102 by a thumb 401 of the left hand to hold up the apparatus, the touch detection unit 121 detects the touch point of the thumb 401 and stores the information in the storage unit 124 (step S201).

The table 600 illustrates an example of the information stored at that time. The ID of the touch point is 0, the coordinates of the touch point position is (40, 340), and the detection time is 0 millisecond. Such information is stored in the storage unit 124 in association with the touch point having the ID 0 (hereinafter referred to as a touch point 0). Further, the movement detection unit 123 stores, in the storage unit 124, the angular information 90 degrees indicating the tilt of the information processing apparatus 100 as the initial angle of the touch point 0. In this state, only one point is detected by the touch detection unit 121. Since the touch point 0 is the first touch point which has been detected, all the input in the touch point is determined as valid (step S206), and the input information is recognized (step S204).

FIG. 4B illustrates the state of the information processing apparatus 100, 20 milliseconds after the state illustrated in FIG. 4A. In this state, the user is in the process of holding up the information processing apparatus 100 with his left hand. As is the case with the state illustrated in FIG. 4A, the thumb 401 is touching the input area 102. The difference from the state in FIG. 4A is that the angle of the information processing apparatus 100 has been changed by 10 degrees with respect to the horizontal line 402. In this state, the touch detection unit 121 obtains information of the touch point touched by the thumb 401 and stores the information in the storage unit 124 (step S201).

The coordinates of the touch point 0 are (40, 340) and they are unchanged from when the touch event "TOUCH" has been detected last time (YES in step S305). Thus, the movement detection unit 123 detects the angle of degrees indicating the tilt of the information processing apparatus 100 and obtains the change in the tilt (step S306). At this time, the change in the tilt is −10 degrees. Since the threshold value of the change in the tilt is set to 20 degrees, the movement detection unit 123 determines that the change in the tilt of the information processing apparatus 100 is less than the threshold value (NO in step S307). Accordingly, the touch detection unit 121 updates the information of the touch point 0 stored in the storage unit 124. More precisely, the touch detection unit 121 maintains the coordinates (40, 340) and changes the time that elapsed to 20 milliseconds (step S309).

The table 601 shows an example of the information which is stored at that time. Even in this state, it is determined that the input by the touch point is all effective (step S206), and the input information is recognized (step S204).

FIG. 4C illustrates the state of the information processing apparatus 100, 20 milliseconds after the state illustrated in FIG. 4B. In this state, the user is also in the process of holding the information processing apparatus 100 with his left hand, and the thumb 401 is touching the input area 102. The angle of the information processing apparatus 100 with respect to the horizontal line 402 is changed by 10 degrees from the state illustrated in FIG. 4B. Information of the touch point touched by the thumb 401 is detected by the touch detection unit 121 and stored in the storage unit 124 (step S201).

The coordinates of the touch point 0 are (40, 340) and they are unchanged from when the touch event "TOUCH" has been detected last time (YES in step S305). Thus, the movement detection unit 123 detects the angle 70 degrees indicating the tilt of the information processing apparatus 100 and obtains the change in the tilt (step S306). At this time, the change in the tilt is −20 degrees. Since the threshold value of the change in the tilt is set to 20 degrees, the movement detection unit 123 determines that the change in the tilt of the information processing apparatus 100 is equal to or greater than the threshold value (YES in step S307). Thus, the movement detection unit 123 sets the tilt change flag to TRUE with respect to the touch point 0 and stores the information in the storage unit 124 (step S308). Accordingly, the touch detection unit 121 updates the information of the touch point 0 stored in the storage unit 124. More precisely, the touch detection unit 121 maintains the coordinates (40, 340) and changes the time that elapsed to 40 milliseconds (step S309).

The table 602 shows an example of the information which is stored at that time. Even in this state, since only a singular number of touch point is detected by the touch detection unit 121, the touch point 0 is the first detected touch point. Accordingly, it is determined that the input by the touch point is all effective (step S206), and the input information is recognized (step S204).

Figure 5A:
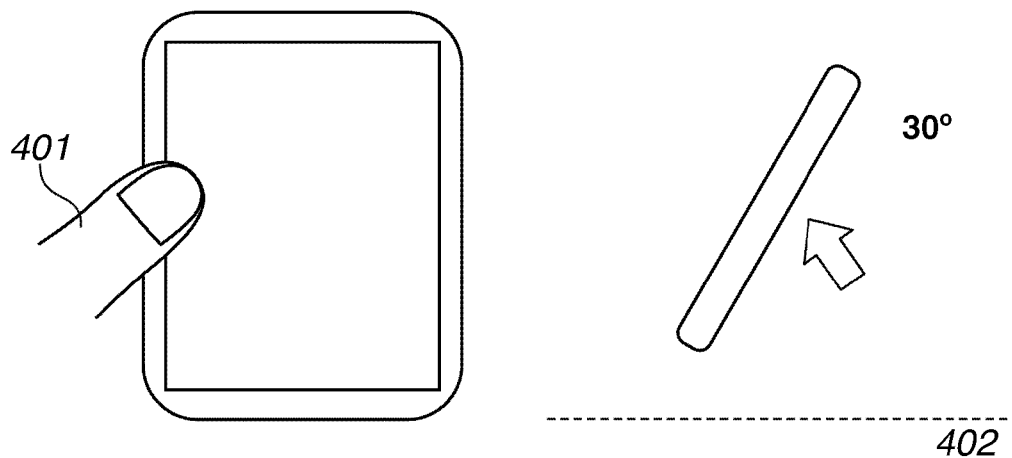
FIGS. 5A to 5C illustrate operation examples of the information processing apparatus.

FIG. 5A illustrates the state of the information processing apparatus 100, 40 milliseconds after the state illustrated in FIG. 4C.

In this state, the user is holding up the information processing apparatus 100 at an easy-to-use angle with his left hand, and the thumb 401 is touching the input area 102. Information of the touch point touched by the thumb 401 is detected by the touch detection unit 121 and the information stored in the storage unit 124 is updated. The movement detection unit 123 obtains the angle (30 degrees) of the tilt of the information processing apparatus 100, obtains the change in the tilt −60 degrees with respect to the initial degree of the touch point, and maintains the tilt change flag.

The table 603 shows an example of the information which is stored at that time. Even in this state, it is determined that the input by the touch point is all effective (step S206), and the input information is recognized (step S204).

Figure 5B:
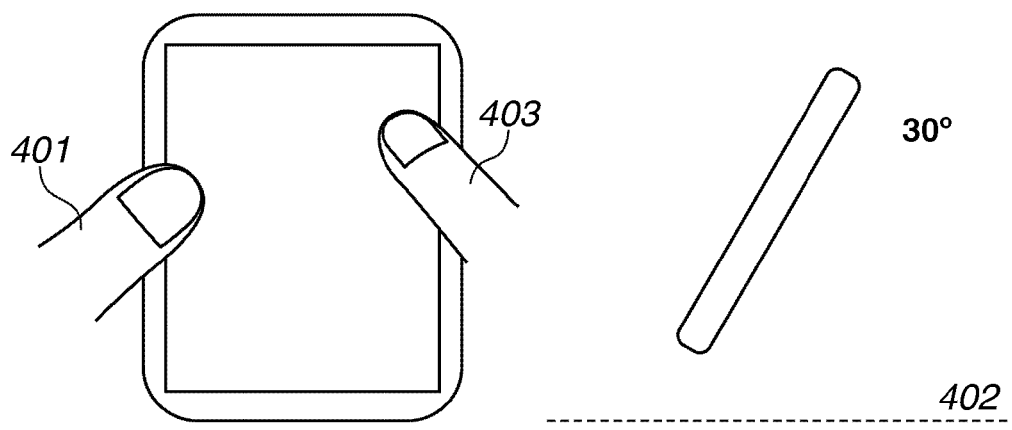

FIG. 5B illustrates the state of the information processing apparatus 100, 1 second after the state illustrated in FIG. 5A. In FIG. 5B, the user is touching the input area 102 with the index finger 403 of the right hand to operate the information processing apparatus 100. Thus, the touch detection unit 121 detects the touch points touched by the thumb 401 and the index finger 403 (step S201). Information of the touch point (touch point 0) corresponding to the position of the thumb 401 includes coordinates (40, 340) and time of 1080 milliseconds. Further, information of a touch point as ID 1 corresponding to the position of the index finger 403 includes coordinates (400, 180) and time of 1070 milliseconds. The information of these points is stored in the storage unit 124.

Since the touch point 1 is closer to the point of origin of the input area 102 than the touch point 0, it is detected earlier by the touch sensor. The movement detection unit 123 detects the tilt angle of 30 degrees of the information processing apparatus 100 regarding the touch point 1 and stores the angle in the storage unit 124 as the initial angle (step S304). Regarding the touch point 0, since the angle has changed −60 degrees from the initial degree 90 degrees, the tilt change flag is maintained (step S308).

The table 604 illustrates an example of the information stored at that time. In this case, since the number of points detected by the touch detection unit 121 is two (YES in step S202), the determination unit 122 refers to the tilt change flag and invalidates the touch point 0 (step S203). Then, the touch information of the touch point 1 that is the valid touch point is recognized as the input information (step S204).

Figure 5C:
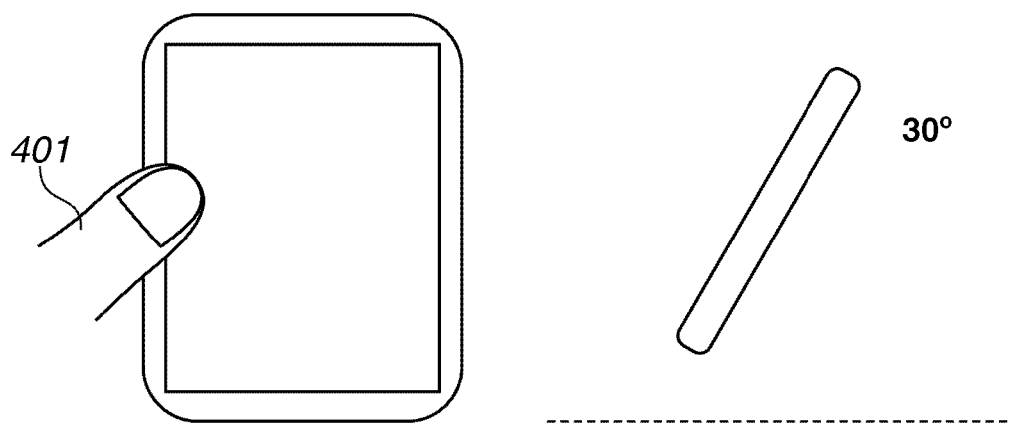

FIG. 5C illustrates the state of the information processing apparatus 100, 1 second after the state illustrated in FIG. 5B. In FIG. 5C, the index finger 403 is released from the input area 102. Thus, only the touch point 0 touched by the thumb 401 is detected by the touch detection unit 121. The table 605 illustrates an example of the information stored at that time. In this case, since the number of points detected by the touch detection unit 121 is not plural (NO in step S202), and the touch point 0 is a touch point which is already invalidated (YES in step S205), the information processing apparatus 100 does not recognize the touch input (step S204).

In this manner, according to the operation example 1, by applying the present embodiment to the information processing apparatus 100 which is capable of multi-touch operation, a false operation can be avoided that may occur due to recognition of the touch point 0 in the input area 102 touched by the user when the user holds the apparatus.

As described above, according to the present embodiment, angular information of the tilt of the information processing apparatus 100 is obtained. The input in the touch point which begins to be detected before the change in the detected angle has become equal to or greater than a threshold value and is being detected when the change is detected, is invalidated. If the tilt of the information processing apparatus 100 is greatly changing, the possibility that the apparatus is being held up or carried by the user, is high. Thus, the touch point which begins to be detected before the tilt of the information processing apparatus 100 has greatly changed and is continuously being detected during the change, is likely to be the touch point in the input area 102 touched by the user to hold up the information processing apparatus 100. According to the present embodiment, since the input in the touch point which is detected when the change in the tilt of the information processing apparatus 100 has become equal to or greater than the threshold value, is invalidated, a false operation due to recognition of unintended operation as the input can be avoided. In other words, an operation despite the user's intention can be reduced.

According to the first exemplary embodiment, when a plurality of touch points is detected by the touch detection unit 121, inputs in at least some of the touch points are invalidated based on the amount of change in the tilt of the information processing apparatus 100. According to a first alternate version of the first exemplary embodiment, when a plurality of touch points is detected and when the number of the detected touch points increases, input information associated with some of the touch points is invalidated. When the number of touch points increases, it is assumed that the user is going to start some kind of operation. Thus, the first alternate version is especially useful in accurately recognizing the effective input when the user starts some kind of operation.

The appearance and hardware configuration of the information processing apparatus 100 according to the first alternate version are similar to those of the first exemplary embodiment.

Figure 7:
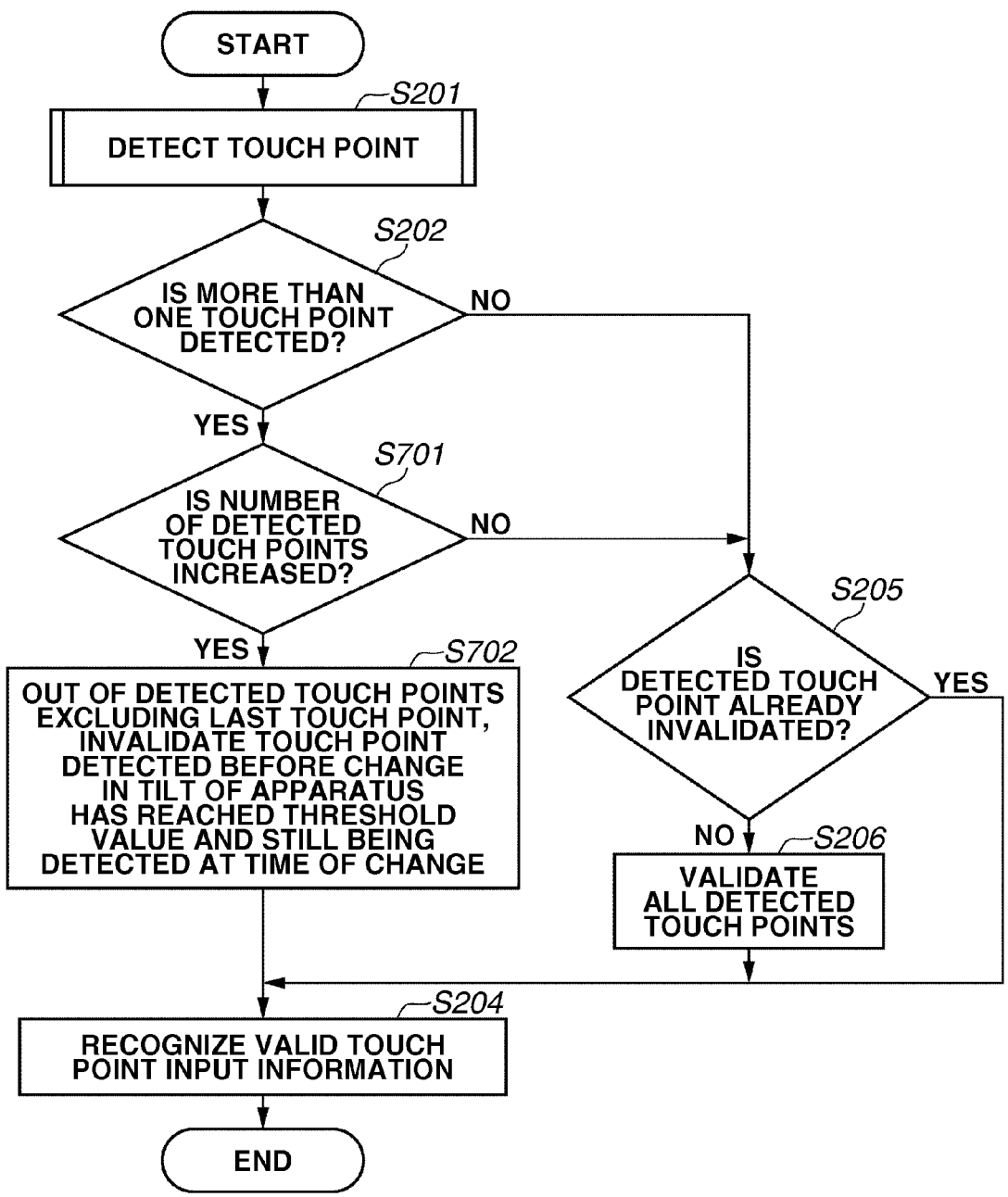
FIG. 7 is a flowchart illustrating the touch input recognition processing.

FIG. 7 is a flowchart illustrating the touch input recognition processing according to the first alternate version. The processes in FIG. 7 which are similar to those in FIG. 2 according to the first exemplary embodiment are denoted by the same process numbers and detailed descriptions are not repeated. The processes different from the first exemplary embodiment are mainly described.

According to the first alternate version, in step S202, if the touch detection unit 121 determines that a plurality of touch points has been detected (YES in step S202), the processing proceeds to step S701.

In step S701, the touch detection unit 121 determines whether the number of the detected touch points has increased. The touch detection unit 121 refers to the information of the ID each time the information stored in the storage unit 124 is updated. The touch detection unit 121 compares the number of touch points in the flow processed last time and the number of touch points in the flow processed this time, and determines whether the number of touch points has increased. If it is determined that the number of detected touch points has increased (YES in step S701), the processing proceeds to step S702. On the other hand, if it is determined that the number of detected touch points has not increased (NO in step S701), the processing proceeds to step S205.

In step S702, among the plurality of touch points which have been detected, excluding the last touch point which begins to be detected and obtained in step S201, the determination unit 122 invalidates the touch point which begins to be detected before the change in the tilt of the information processing apparatus 100 has been detected and is being detected when the change is detected.

The method for identifying the touch point which is being detected when the change in the tilt of the apparatus has been detected in step S702 is similar to the method used in step S203 in FIG. 2 according to the first exemplary embodiment. Thus, the determination unit 122 refers to the information stored in the storage unit 124 and determines the touch point to be invalidated based on the state of the tilt change flag (TRUE or FALSE). The tilt change flag indicates whether the tilt of the information processing apparatus 100 has become equal to or greater than the threshold value, and notifies the recognition unit 125 of the result.

Other steps are processed according to the touch input recognition processing of the information processing apparatus 100 illustrated in the flowchart in FIG. 2.

As described above, according to the first alternate version of the first exemplary embodiment, when the number of the detected touch points is increased, it is presumed that the user is going to perform an operation in the last touch point which has been detected. Thus, out of the detected plurality of touch points, some of the touch points which are not the latest touch point are invalidated. At that time, the input in the touch point which begins to be detected before the change of the tilt of the information processing apparatus has become equal to or greater than a threshold value and is being detected when the change is detected will be invalidated. This is because if the tilt of the information processing apparatus 100 is greatly changing, the possibility that the apparatus is held up or carried by the user is high. Thus, the possibility that the user is touching the input area 102 while holding up the information processing apparatus 100 is high.

Further, according to the first alternate version, when a new touch point is detected, it is determined whether previously-detected touch points are to be invalidated. When a new touch point is detected, the possibility that the user is starting an operation with the information processing apparatus 100 is high. Thus, according to the information processing apparatus 100 of the first alternate version of the first exemplary embodiment, a false operation despite the user's intention can be reduced.

According to a second alternate version of the present invention, if a movement of some touch points out of the detected touch points is detected, among the touch points excluding the touch point whose movement has been lastly detected, input in a touch point that satisfies a condition is invalidated. If a touch point is moved by the user, the possibility that the user is moving the touch point to perform some kind of operation is high. Thus, according to the second alternate version, processing useful in recognizing accurate input can be performed especially at the time the user is presumed to start some kind of operation.

The appearance and hardware configuration of the information processing apparatus 100 according to the second alternate version are similar to those of the first exemplary embodiment and the first alternate version.

Figure 8:
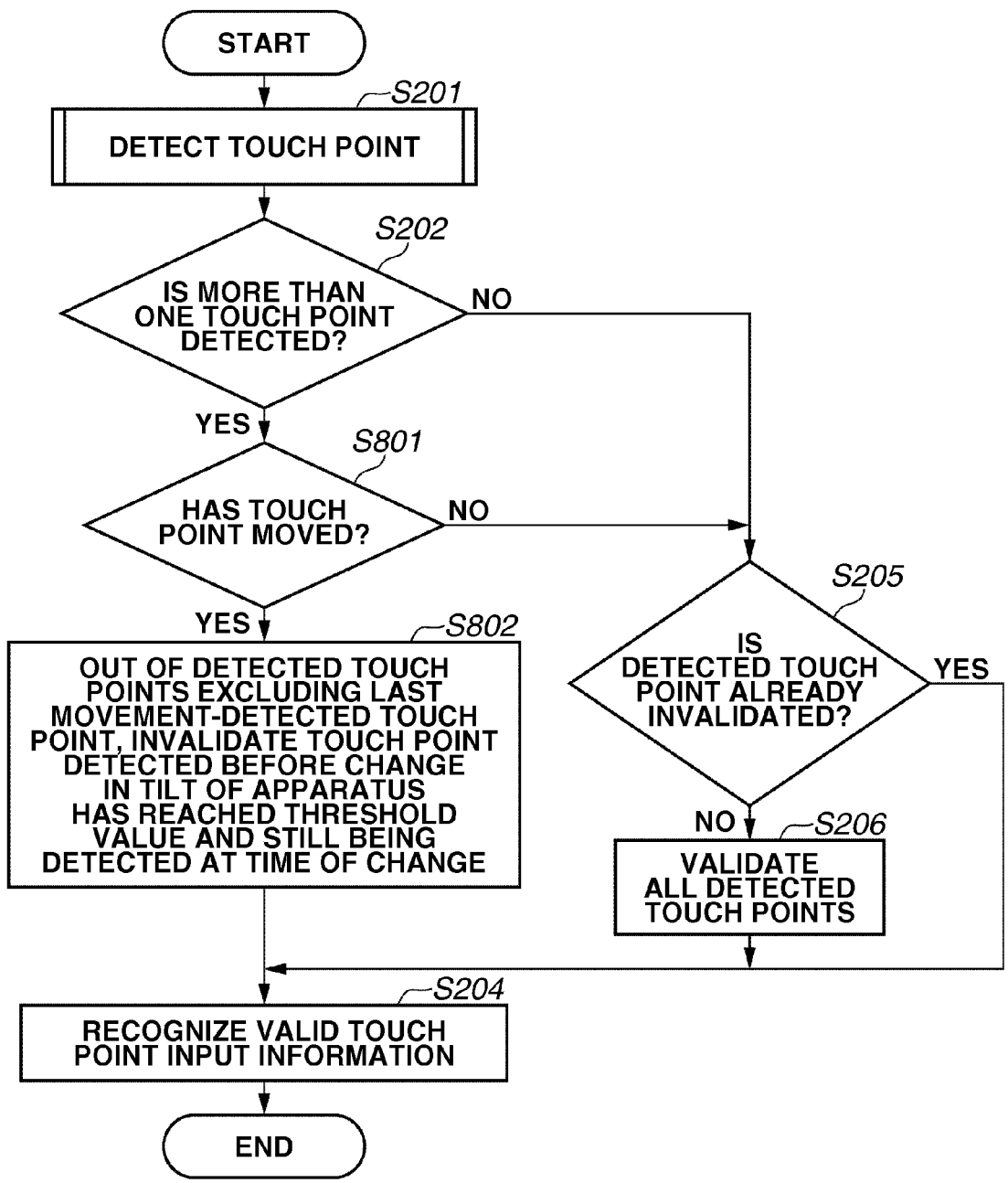
FIG. 8 is a flowchart illustrating the touch input recognition processing.

FIG. 8 is a flowchart illustrating the touch input recognition processing according to the second alternate version. The processes in FIG. 8 which are similar to those in FIG. 2 according to the first exemplary embodiment are denoted by the same process numbers. In step S201 of the present embodiment, if a touch point whose ID has already been detected is detected at a position different from the position of the touch point which has been detected last time (NO in step S305), the position information obtained this time and the position information obtained last time are stored and the movement flag is set to TRUE. If a touch point whose ID has already been detected is detected at a position same as the position of the touch point which has been detected last time, the movement flag is set to FALSE.

In step S202, if it is determined that a plurality of touch points has been detected, the processing proceeds to step S801. In step S801, the touch detection unit 121 determines whether the touch point has moved. According to the present embodiment, the touch detection unit 121 determines whether the movement flag is set in the storage unit 124 regarding the touch point obtained in step S201. Further, regarding the touch points having the movement flag set, the touch detection unit 121 calculates the moving distance of each touch point based on the stored IDs of the touch points, position information before and after the movement, and detection time. Then, the touch detection unit 121 compares the moving distance with a threshold value of a predetermined distance.

The predetermined distance is used for determining whether the user has moved the touch point to perform the touch operation. The predetermined distance is set to the minimum moving distance of the touch point necessary in recognizing the touch operation and is registered in advance in the information processing apparatus 100. If the moving distance of the touch point is equal to or greater than the predetermined distance, the touch detection unit 121 determines that the touch point has moved (YES in step S801), and the processing proceeds to step S802. On the other hand, if the movement flag is not set for the touch point or the moving distance of the touch point is less than the predetermined distance, the touch detection unit 121 determines that the touch point has not moved (NO in step S801), and the processing proceeds to step S205.

In step S802, out of the touch points excluding the touch point obtained in step S201, in other words, out of the touch points excluding the last touch point whose movement has been detected, the determination unit 122 invalidates the touch point which begins to be detected before the tilt of the information processing apparatus 100 changes, and is being detected when the change is detected. The method for identifying the touch point which is being detected when the change in the tilt of the apparatus has been detected in step S802 is similar to the method used in step S203 in FIG. 2 according to the first exemplary embodiment. Thus, the determination unit 122 refers to the information stored in the storage unit 124 and determines the touch point to be invalidated based on the state of the tilt change flag (TRUE or FALSE) that indicates whether the tilt of the information processing apparatus 100 has become equal to or greater than the threshold value, and notifies the recognition unit 125 of the result.

Processing of other steps is processed similar to the touch input recognition processing of the information processing apparatus 100 illustrated in the flowchart in FIG. 2.

According to the second alternate version, when a movement of a touch point is detected, out of the touch points other than the last touch point whose movement has been detected, the touch points that satisfy the condition are invalidated. Thus, the information processing apparatus 100 according to the second alternate version of the first exemplary embodiment can reduce a false operation despite the user's intention.

According to the first exemplary embodiment and the alternate versions described above, when a new touch event is detected by the touch detection unit 121, the touch point which begins to be detected before the change of the tilt of the information processing apparatus has become equal to or greater than a threshold value, and is being detected when the change is detected, is invalidated. On the contrary, according to a third alternate version of the first exemplary embodiment, each time the movement detection unit 123 determines that the tilt of the apparatus has become equal to or greater than a threshold value, all the touch points which have been detected at that time are invalidated. According to an example described below, after it is determined based on the above-described processing of the first exemplary embodiment whether a touch point is to be invalidated, the movement detection unit 123 detects the tilt of the apparatus. If the tilt has changed by a value equal to or greater than the threshold value, the touch point which has been recognized as the input will be invalidated.

The appearance and hardware configuration of the information processing apparatus 100 according to the third alternate version are similar to those of the first exemplary embodiment and the first and the second alternate versions. Further, regarding the third alternate version, the touch input recognition processing is also executed according to a program described with reference to the flowchart in FIG. 2 or 7 or 8. However, according to the third alternate version, after the recognition unit 125 recognizes the input information as the valid touch points in step S204, step S902 in FIG. 9 is executed.

FIG. 9 is a flowchart illustrating an example of the touch point invalidation processing according to the third alternate version.

In step S901, the movement detection unit 123 initializes the history information of tilt stored in the storage unit 124.

In step S902, the movement detection unit 123 obtains angular information of the tilt of the information processing apparatus 100 and stores the history of the obtained angular information in the storage unit 124. The angle sensor 117 according to the present embodiment detects the tilt of the information processing apparatus 100 every 10 milliseconds and notifies the result to the movement detection unit 123. Thus, history information is added to the storage unit 124 every 10 milliseconds. In step S903, the determination unit 122 determines whether the change in the value of the angle that indicates the tilt of the information processing apparatus 100 is equal to or greater than a threshold value within a predetermined period of time. According to the third alternate version, the predetermined period of time is set to 1 second.

The movement detection unit 123 refers to the history information stored in the storage unit 124 and determines whether the sum of the changes in the angle is equal to or greater than the threshold value within the latest 1 second. Although the threshold value of the angle is in this case the same as the threshold value used in step S307 in the first exemplary embodiment, a different value can be used as the threshold value. Further, a value obtained by adding the absolute value of the amount of change can be used for the accumulated angles.

If it is determined that the change is less than the threshold value (NO in step S903), the processing returns to step S902, and the movement detection unit 123 repeats the processing with a period of obtaining the angular information from the angle sensor 117. On the other hand, if it is determined that the change is equal to or greater than the threshold value (YES in step S903), the processing proceeds to step S904.

In step S904, the determination unit 122 invalidates all the detected touch points, and the processing ends. While the processing in steps S902 to S904 is being executed, if the touch is released and the touch event "RELEASE" is notified, the processing is stopped.

Thus, according to the third alternate version, all the detected touch points are invalidated not only at the time a touch event is detected but also each time the change in the tilt of the information processing apparatus 100 becomes equal to or greater than the threshold value. Thus, the touch point which has been determined as valid at the time the touch event has been detected by the touch detection unit 121 can be invalidated if the change in the tilt of the information processing apparatus 100 becomes equal to or greater than the threshold value. Accordingly, by tilting the information processing apparatus 100 to make the change in the tilt equal to or greater than the threshold value, the user can invalidate any touch point.

For example, after holding the information processing apparatus 100 at an angle convenient for operation and then changing the hand position to hold the apparatus again, a new touch point is detected, which may be recognized as an input. In such a case, according to the third alternate version, by greatly changing the tilt of the information processing apparatus 100, the user can invalidate the touch point in the input area 102 which the user is touching at that time, when the touch point serves as input into the information processing apparatus 100. In this manner, since the user can invalidate the touch input in an arbitrary touch point, a false operation despite the user's intention can be reduced.

According to the third alternate version, although the touch point invalidation processing illustrated in the flowchart in FIG. 9 is described as processing which is performed after the execution of the processing of the first exemplary embodiment and the alternate versions, the invalidation processing is not limited to such an example. For example, the above-described touch point invalidation processing can be, for example, performed separately from and in parallel with the processing described with reference to FIG. 2.

According to the exemplary embodiment described above, although the tilt change flag is set corresponding to each touch point, the present invention is not limited to such an example. For example, unique bit arrangement identification information can be provided to identify the tilt change flag only when the tilt change flag is set to TRUE. It can be indicated by the arrangement identification information whether the tilt change flag is set to TRUE. In this case, if the tilt change flag corresponds to FALSE, the bit corresponding to the tilt change flag is not provided.

Figure 10A:
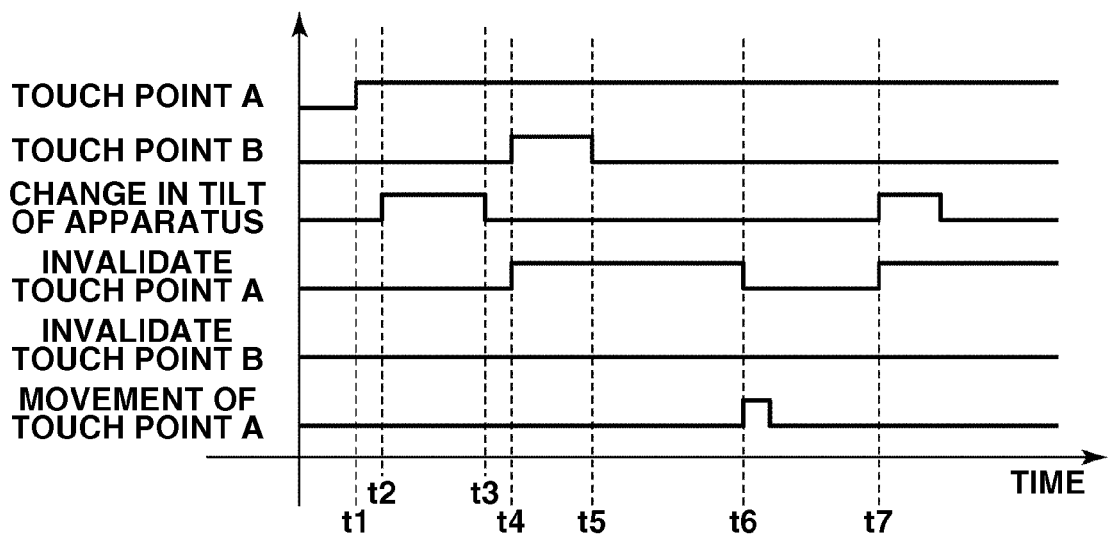
FIG. 10A is a timing chart of the information processing apparatus when touch input recognition of two touch points is performed.
Figure 10B:
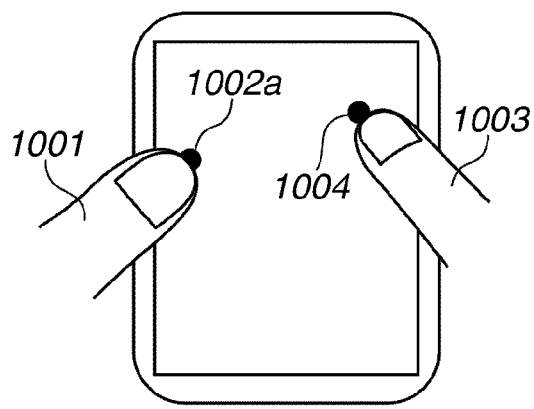
FIGS. 10B and 10C illustrate operation examples of the information processing apparatus.

Further, the above-described first exemplary embodiment and the first to the third alternate versions can be combined. FIG. 10A is a timing chart of the touch input recognition processing of two touch points performed by the information processing apparatus 100 executing a combination of the first exemplary embodiment and the second and the third alternate versions. FIG. 10B illustrates the state of the information processing apparatus 100 at that time. A touch point 1002a touched by a thumb 1001 of the user's left hand is described as a touch point A and a touch point 1004 touched by an index finger 1003 of the user's right hand is described as a touch point B.

In the timing chart in FIG. 10A, processing according to the above-described first exemplary embodiment is executed from timing t1 to t6. First, at t1, similar to the operation example 1, since the thumb 1001 of the user's left hand touched the input area 102 when the user held up the information processing apparatus 100 placed on a horizontal plane, the touch point A is detected by the touch detection unit 121. Then, the change in the tilt of the apparatus by a value equal to or greater than the threshold value is detected by the movement detection unit 123 from t2 to t3.

In other words, the touch point A is detected from t1 before the change in the tilt of the apparatus becomes equal to or greater than the threshold value and is also detected from t2 to t3 after the change has been detected. Thus, at t4 where the touch point B is detected and the number of detected touch points is increased to two, the touch point A is invalidated. Since the touch point B is not detected before the tilt of the apparatus changes but is detected after completion of the change in the tilt, the input is recognized without being invalidated until the touch is released at t5. At t5, even after the touch point B is released from the input area 102, the touch point A is continuously invalidated.

Figure 10C:
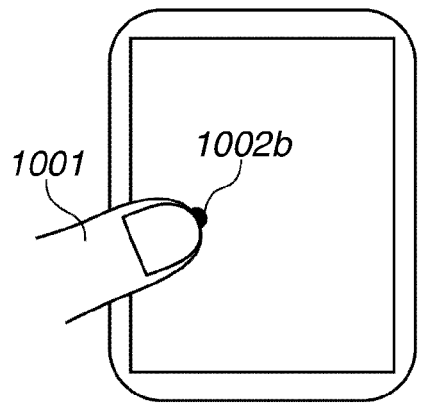

In the timing chart in FIG. 10A, processing according to the second alternate version of the first exemplary embodiment is executed from t6 to t7. At t6, the touch point A is moved to a touch point 1002b in FIG. 10C. Since the movement of the touch point A is detected by the touch detection unit 121, input in the touch point A is determined as valid on and after t6.

In the timing chart in FIG. 10A, at t7 and thereafter, processing according to the third alternate version of the first exemplary embodiment is executed. At t7, while the user continues to touch the touch point A, the user tilts the information processing apparatus 100 so that the change in tilt becomes equal to or greater than the threshold value. Thus, at t7 and thereafter where the movement detection unit 123 detects the change in the tilt, the touch input in the touch point A is invalidated again.

In this manner, by combining the first exemplary embodiment and the alternate versions, the touch input in the touch point can be invalidated according to the operation intended by the user. Accordingly, the information processing apparatus 100 with enhanced operability can be provided.

Further, according to the above-described first exemplary embodiment and the alternate versions, the touch point to be invalidated is determined based on the amount of change of the angle indicating the tilt of the information processing apparatus 100. However, the touch point to be invalidated can be determined based on the amount of movement of the information processing apparatus 100 which is calculated by obtaining the position of the information processing apparatus 100. For example, by using the indoor global positioning system (GPS), a relative position of the information processing apparatus 100 in a certain range can be detected. Then, the touch point which begins to be detected before the apparatus moves in a predetermined distance or more and is still being detected when the movement is detected, is invalidated.

In this manner, by using the relative position in a certain range, even if the user is, for example, traveling on a train or in a car, a valid touch operation can be performed between before and after the user starts movement. Further, by using an acceleration sensor, the acceleration of the movement of the information processing apparatus 100 can be detected. If the information processing apparatus 100 is moved with a predetermined acceleration or more, it is presumed that the apparatus has been held up. In this case, the touch point which begins to be detected before the movement starts to hold the apparatus and is still detected during the movement, is invalidated. In such a manner, if at least one of acceleration, position change, and tilt change of the apparatus begins to be detected before the condition is satisfied and is being detected when the condition is satisfied, the corresponding touch point can be invalidated.

The above-described exemplary embodiments can also be achieved by supplying a software program that implements each function of aforementioned exemplary embodiments to a system or an apparatus via a network or various types of storage media, and a computer (or a CPU or a MPU) in the system or the apparatus reads and executes the program stored in such storage media.

According to the present invention, in an apparatus which is capable of touch operation, a false operation due to touch operation despite the user's intention can be prevented without being affected by the position of the information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-147152 filed Jun. 29, 2012, which is hereby incorporated by reference herein in its entirety.

What is claimed is:

1. An information processing apparatus which recognizes a multi touch operation, the apparatus comprising:
a touch detection unit configured to detect a touch point on a target area of a touch operation;
a first determination unit configured to determine whether a number of touch points being detected on the target area is two or more based on information detected by the touch detection unit;
a movement detection unit configured to detect a movement of the information processing apparatus;
a second determination unit configured to determine, in a case where the first determination unit determines that the number of touch points being detected on the target area is two or more, a touch point which begins to be detected before the movement and is being detected when the movement is detected among the two or more touch points being detected on the target area, as invalid; and
a recognition unit configured to recognize the touch operation using the information of all remaining points excluding the touch point determined as invalid by the second determination unit among the two or more touch points are being detected on the target area.

2. The information processing apparatus according to claim 1,
wherein, in a case where the first determination unit determines that the number of touch points being detected on the target area is not two or more but one, the second determination unit further determines whether the one touch point being detected on the target area has already been determined as invalid by the second determination unit after the one touch point begins to be detected, and
wherein the second determination unit, in a case where the one touch point being detected on the target area has not been determined as invalid by the second determination unit after the one touch point begins to be detected, does not determine the one touch point as invalid, and
in a case where the one touch point being detected on the target area has been determined as invalid by the second determination unit after the one touch point begins to be detected, the second determination unit continuously invalidates the one touch point.

3. The information processing apparatus according to claim 2, wherein the second determination unit, in a case where the one touch point being detected on the target area has not been determined as invalid by the second determination unit after the one touch point begins to be detected, determines the one touch point as valid without determining whether the one touch point begins to be detected before the movement and is being detected when the movement is detected among the two or more touch points.

4. The information processing apparatus according to claim 1, wherein the second determination unit invalidates the touch point which begins to be detected before the movement and is being detected when the movement is detected, as a touch point in the target area touched by a hand holding the information processing apparatus.

5. The information processing apparatus according to claim 1, wherein the movement detection unit detects information about a tilt angle of the information processing apparatus,
wherein among the two or more touch points being detected on the target area, the second determination unit invalidates a touch point which begins to be detected before the angle detected by the movement detection unit changes by a value equal to or greater than a threshold value and is being detected when the change is detected.

6. The information processing apparatus according to claim 5, wherein regarding a touch point excluding a last detected touch point or a last movement-detected touch point among the plurality of touch points, the second determination unit invalidates input in a touch point which begins to be detected before the angle of the information processing apparatus changes by a value equal to or greater than the threshold value and is being detected when the change is detected.

7. The information processing apparatus according to claim 6, wherein if a number of the touch points detected by the touch detection unit has increased, regarding a touch point excluding the last detected touch point among the plurality of touch points, the second determination unit invalidates input in the touch point which begins to be detected before the angle of the information processing apparatus changes by a value equal to or greater than the threshold value and is being detected when the change is detected.

8. The information processing apparatus according to claim 6, wherein among the plurality of touch points detected by the touch detection unit, if some of the touch points are detected to have moved in a predetermined distance or greater, regarding a touch point excluding the last movement-detected touch point, the second determination unit invalidates input in the touch point which begins to be detected before the angle of the information processing apparatus changes by a value equal to or greater than the threshold value and is being detected when the change is detected.

9. The information processing apparatus according to claim 5, wherein the second determination unit invalidates all the touch points detected by the touch detection unit each time the angle detected by the movement detection unit changes by a value equal to or greater than the threshold value.

10. The information processing apparatus according to claim 1, wherein the movement detection unit detects information about a position where the information processing apparatus exists; and
wherein among the two or more touch points being detected on the target area, the second determination unit invalidates a touch point which begins to be detected before the position detected by the movement detection unit changes by a value equal to or greater than a threshold value and is being detected when the change is detected.

11. The information processing apparatus according to claim 10, wherein the position information detected by the movement detection unit is relative position information of the information processing apparatus in a particular range.

12. The information processing apparatus according to claim 10, wherein the second determination unit invalidates a touch point which begins to be detected before the position detected by the movement detection unit changes with an acceleration equal to or greater than a threshold value and is being detected when the change is detected.

13. A non-transitory computer-readable recording medium storing a program which, when read and executed by a computer, causes an apparatus to perform operations as an information processing apparatus which recognizes a multi touch operation, the apparatus comprising:
a touch detection unit configured to detect a touch point on a target area of a touch operation;
a first determination unit configured to determine whether a number of touch points being detected on the target area is two or more based on information detected by the touch detection unit;
a movement detection unit configured to detect a movement of the information processing apparatus;
a second determination unit configured to determine, in a case where the first determination unit determines that the number of touch points being detected on the target area is two or more, a touch point which begins to be detected before the movement and is being detected when the movement is detected among the two or more touch points being detected on the target area, as invalid; and
a recognition unit configured to recognize the touch operation using the information of all remaining points excluding the touch point determined as invalid by the second determination unit among the two or more touch points are being detected on the target area.

14. The information processing apparatus according to claim 1, wherein, in a case where the number of touch points being detected on the target area is two and one of the two touch points is determined as invalid by the second determination unit, the two touch points being detected on the target area are not recognized as an input of a multi touch operation.

15. A control method for an information processing apparatus recognizing a touch operation, the method comprising:
detecting a touch point on a target area of the touch operation;
first determining whether a number of touch points being detected on the target area is two or more based on information detected by the detecting;
detecting a movement of the information processing apparatus;
second determining, in a case where the first determining determines that the number of touch points being detected on the target area is two or more, a touch point which begins to be detected before the movement and is being detected when the movement is detected among the two or more touch points being detected on the target area, as invalid; and
recognizing the touch operation using the information of all remaining points excluding the touch point determined as invalid by the second determining among the two or more touch points are being detected on the target area.

16. The control method of the information processing apparatus according to claim 15,
wherein, in a case where the first determining determines that the number of touch points being detected on the target area is not two or more but one, the second determining further determines whether the one touch point being detected on the target area has already been determined as invalid by the second determining after the one touch point begins to be detected, and
wherein the second determining, in a case where the one touch point being detected on the target area has not been determined as invalid by the second determining after the one touch point begins to be detected, does not determine the one touch point as invalid, and
in a case where the one touch point being detected on the target area has been determined as invalid by the second determining after the one touch point begins to be detected, the second determining continuously invalidates the one touch point.

17. The control method according to claim 16, wherein the second determining, in a case where the one touch point being detected on the target area has not been determined as invalid by the second determining after the one touch point begins to be detected, determines the one touch point as valid without determining whether the one touch point begins to be detected before the movement and is being detected when the movement is detected among the two or more touch points.

18. The control method of the information processing apparatus according to claim 15, wherein when the movement is detected, information about a tilt angle of the information processing apparatus is detected; and
wherein when determination is made by the second determining, among the two or more touch points being detected on the target area, a touch point is invalidated which begins to be detected before the tilt angle of the information processing apparatus changes by a value equal to or greater than a threshold value and is being detected when the change is detected.

19. The control method of the information processing apparatus according to claim 15, wherein when the movement is detected, information about a position where the information processing apparatus exists, is detected; and
wherein when determination is made by the second determining, among the two or more touch points being detected on the target area, a touch point is invalidated which begins to be detected before the position where the information processing apparatus exists, changes by a value equal to or greater than a threshold value and is being detected when the change is detected.

* * * * *